United States Patent [19]

Yamada et al.

[11] 4,251,783

[45] Feb. 17, 1981

[54] VARIABLE RESONANCE TYPE AMPLITUDE EQUALIZING CIRCUIT

[75] Inventors: Takahiko Yamada, Tokyo; Kozo Morita, Yokosuka, both of Japan

[73] Assignees: Nippon Electric Co., Ltd.; Nippon Telegraph and Telephone Public Corporation, both of Tokyo, Japan

[21] Appl. No.: 26,988

[22] Filed: Apr. 4, 1979

[30] Foreign Application Priority Data

Apr. 4, 1978 [JP] Japan .................................. 53-39842

[51] Int. Cl.³ ............................................ H03H 7/03
[52] U.S. Cl. .................................. 333/28 R; 333/223
[58] Field of Search ...................... 333/28 R, 205, 207, 333/223; 307/320; 334/45

[56] References Cited

U.S. PATENT DOCUMENTS

| | | | |
|---|---|---|---|
| 3,204,198 | 8/1965 | Bachnick | 334/45 X |
| 3,307,099 | 2/1967 | Weller et al. | 334/45 UX |
| 3,356,952 | 12/1967 | Sev | 334/45 X |

OTHER PUBLICATIONS

Morita, *Variable Resonance Type Automatic Equalizer*, Inst. of Electr. Commun. (Japan), 61st Anniversary Gen. Meet. Papers, vol. 8, 8-92.

*Primary Examiner*—Paul L. Gensler
*Attorney, Agent, or Firm*—Townsend and Townsend

[57] ABSTRACT

A variable resistance device in the form of a PIN diode is connected between one of a pair of input terminals and one of a pair of output terminals, and the other input and output terminals are connected to a common terminal.

A distributed constant line is connected between the output terminal of the PIN diode and the common terminal, and variable capacitance diodes are connected between the opposite ends of the distributed constant line and the common terminal. By applying a control voltage applied to the PIN diode and the variable capacitance diodes, the steepness and the center frequency of the variable resistance device are varied.

5 Claims, 8 Drawing Figures

VARIABLE RESONANCE TYPE AMPLITUDE EQUALIZING CIRCUIT

BACKGROUND OF THE INVENTION

This invention relates to an amplitude equalizing circuit and more particularly a variable resonance type amplitude equalizing circuit for equalizing the amplitude distortion caused by fading in a wireless communication system, for example.

In a wireless communication system, in addition to an electric wave sent directly from a transmission station, waves reflected from the ground, mountains, sea and buildings or waves which are caused to refract many times by ducts are generally received so that so-called selective or multipath fading occurs. When a modulated wave is subjected to such fading, the effect of fading is caused to vary due to a small difference in the side band frequency which causes an amplitude variation and hence a transmission distortion. Various amplitude equalizing circuits have been proposed for the purpose of preventing such fading.

Generally such amplitude equalizing circuit comprises first and second input terminals, first and second output terminals, a variable resistor connected between the first input terminal and the first output terminal for adjusting the peak of an equalizing characteristic curve, and a line having a wavelength ¼ of the center frequency of the fading and connected between the first and second output terminals. Generally, the second input terminal and the second output terminal are connected in common and maintained at the ground potential. However, such amplitude equalizing circuit is not advantageous in that it is necessary to vary the length of the line as the center frequency of the fading varies. For the purpose of equivalently varying the length of the line we have already proposed to connect a series resonance circuit comprised by a coil and a capacitor in series with the line as disclosed in Kozo Morita's paper "Variable Resonance Type Automatic Equalizer" Institute of Electronic Communication (Japan), 61th Anniversary General Meeting Papers Vol. 8, 8–92. With the circuit disclosed in this paper, in order to increase the degree of variation in the line length it is necessary to increase the variation in the resonance frequency of the series resonance circuit, that is the degree of variation in the inductance of the coil and the electrostatic capacitance of the capacitor. However, it is impossible to obtain an inductive element capable of operating at frequencies above a VHF band and which can effectively vary its inductance. Accordingly, the width of variation in the resonance frequency is solely determined by the range of variation in the electrostatic capacitance of the capacitor. For this reason it is impossible to equivalently vary the line length in a large amount. With the above described circuit utilizing a series resonance circuit, in a frequency band of 100–200 MHz, it was possible to vary the bandwidth of the center frequency by only ±15 MHz. In other words, it has been impossible to equalize the amplitude distortion of the center frequency of the fading over a wideband.

SUMMARY OF THE INVENTION

Accordingly, it is an object of this invention to provide a variable resonance type amplitude equalizing circuit capable of varying the center frequency of the amplitude equalizing characteristic in a bandwidth broader than that of the prior art circuit.

Another object of this invention is to provide an improved variable resonance type amplitude equalizing circuit capable of removing an anti-resonance point occuring between the center frequency of the amplitude equalizing characteristic and a zero frequency (direct current) thereby broadening the bandwidth.

Briefly stated, the amplitude equalizing circuit of this invention comprises a variable resistance device connected between one of a pair of input terminals and one of a pair of output terminals, a common terminal connected the other ones of the input and output terminal pairs, a distributed constant line connected between the common terminal and the input or output terminal connected to the variable resistance device, a pair of variable capacitance means connected between the common terminal and both input and output terminals of the distributed constant line, and means for the variable resistance device and the variable capacitance means for varying the steepness and the center frequency of the amplitude equalizing characteristic of the amplitude equalizing circuit respectively.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
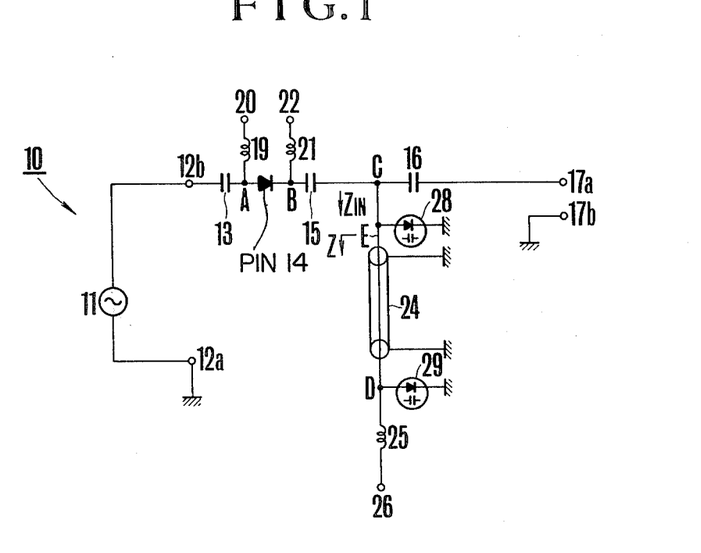
FIG. 1 is a connection diagram showing one embodiment of the amplitude equalizing circuit of this invention.

Referring now to the accompanying drawings the input terminals 12a and 12b of an amplitude equalizing circuit 10 of this invention shown in FIG. 1 are connected across the signal source 11 having a low output impedance. One input terminal 12a is grounded, while the other input terminal 12b is connected to one voltage output terminal 17a via a capacitor 13, a PIN diode 14, and DC blocking capacitors 15 and 16 which are connected in series. The other voltage output terminal 17b is grounded. A PIN diode control voltage input terminal 20 is connected to the junction between capacitor 13 and the PIN diode 14 via a choke coil 19, while a PIN diode control voltage input terminal 22 is connected to the junction between the PIN diode 14 and capacitor 15 through a choke coil 21. The capacitors 13 and 15, the PIN diode 14, the choke coils 19 and 21 and the control voltage terminals 20 and 22 constitute a variable resistance device so as to vary the resistance value of the diode 14 depending upon the value of the voltage impressed across terminals 20 and 22.

One example of the PIN diode 14 utilized as the variable resistance device and its characteristics will be described briefly.

As is well known in the art, the PIN diode 14 is constructed such that an I type semiconductor is interposed between the P region and the N region of the PN junction diode. In this example, ISV 34 or ISV 35 type PIN diode manufactured by Nippon Electric Co. is used. The forward current-resistance characteristic is as follows. In the following table I the lefthand column shows the forward currents flowing through the diode and the righthand column the resistance values mainfested by the diode when the currents are passed

TABLE I

| | |
|---|---|
| 0.001mA | 10KΩ |
| 0.01mA | 3.5KΩ |
| 0.1mA | 360Ω |
| 1mA | 35Ω |
| 10mA | 8Ω |

From these data it will be clear that this diode can be used as a variable resistance element. A coaxial line 24 having a distributed constant and a length corresponding to ¼ of the center frequency of the fading is connected between the junction C between capacitors 15 and 16 and ground. Thus, one end of the central conductor of the coaxial line 24 is connected to the junction C, whereas the outer conductor is grounded or coupled to a common terminal of a high frequency circuit. The other end of the central conductor is connected to a control input terminal 26 of a variable capacitance diode to be described later through a signal blocking choke coil 25. A variable capacitance diode 28 that is a varactor diode is connected between the junction C and the ground, and another variable capacitance diode 29 is connected between the junction D between the central conductor of the coaxial line 24 and the choke coil 25 and ground. The variable capacitance diode varies its capacitance when a variable voltage is applied across its anode and cathode electrodes in the reverse direction so that it is used as a variable capacitance element. In this example, type IS2208 diode manufactured by Nippon Electric Co. is used. This diode has a voltage-capacitance characteristic as shown in the following Table II in which the lefthand column shows the applied voltages and the righthand column shows capacitances at respective voltages.

TABLE II

| | |
|---|---|
| 0.5V | 19pF |
| 1V | 17pF |
| 2V | 14pF |
| 4V | 10pF |
| 7V | 6.5pF |
| 10V | 4.5pF |
| 20V | 2.4pF |

Thus when the voltage applied to the PIN diode through control terminals 20 and 22 is varied the current flowing through the PIN diode varies thus varying the resistance R of the variable resistance device. Consequently, it is possible to vary the Q of the resonance circuit, that is the steepness of the fading equalizing circuit.

When the voltage applied to the control terminals 26 is varied, the capacitance of the variable capacitance diodes 28 and 29 are also varied thereby simultaneously varying the capacitance and the equivalent inductance of the resonance circuit. Consequently, it is possible to vary the center frequency $f_0$ of the fading equalizing characteristic in a bandwidth wider than that of the prior art.

The embodiment shown in FIG. 1 can vary the center frequency in a bandwidth wider than the prior art series resonance circuit as will be described hereunder.

Suppose now that a prior art series resonance circuit is connected to a distributed constant line. The impedance $Z_{in}$ of such amplitude equalizing circuit as seen from the output terminal of the coaxial line is expressed by $$Z_{in} = \frac{Z_L \cdot \cos \beta l + jZ_0 \sin \beta l}{jZ_L \cdot \sin \beta l + Z_0 \cos \beta l} \times Z_0 \tag{1}$$

where
L: the inductance of the coil comprising the series resonance circuit,
C: the capacitance of the capacitor,
$Z_0$: the characteristic impedance of the line,
l: the length of the line,
β: the phase constant of the line, and
$Z_L$:

$$j(\omega L - \frac{1}{\omega C}).$$

Putting $$Z_L = j(\omega L - \frac{1}{\omega C}) = j \boldsymbol{\ell} L,$$

then $$Z_{in} = j \frac{\boldsymbol{\ell} L \cdot \cos \beta l + Z_0 \cdot \sin \beta l}{Z_0 \cdot \cos \beta l - \boldsymbol{\ell} L \cdot \sin \beta l} \cdot Z_0$$

Consequently, the amplitude characteristic $H'(\omega)$ between the input and the output of this circuit is expressed by the following equation (2).

$$|H'(\omega)| = \left| \frac{Z_{in}}{R + Z_{in}} \right| = \tag{2}$$

$$\frac{1}{\sqrt{1 + (\frac{R}{Z_0})^2 (\frac{Z_0 \cdot \cos \beta l - \boldsymbol{\ell} L \cdot \sin \beta l}{L \cdot \cos \beta l + Z_0 \cdot \sin \beta l})^2}}$$

The center frequency of the equalizing characteristic, that is the resonance frequency $f_0$ at which the pass loss becomes zero is obtained by making zero the terms in the brackets in the demoninator in equation (2). Thus, $$Z_0 \cdot \cos \beta l - \boldsymbol{\ell} L \cdot \sin \beta l = \tag{3}$$
$$Z_0 \cdot \cos \beta l - (\omega L - \frac{1}{\omega C}) \sin \beta l = 0$$

By determining the angular frequency ω of this equation, the center frequency $f_0$ can be determined.

The impedance of the distribution constant line as seen from point E, FIG. 1, is expressed by an equation $$Z = \frac{\frac{1}{j\omega C_2} \cdot \cos \beta l + jZ_0 \cdot \sin \beta l}{j\frac{1}{j\omega C_2} \cdot \sin \beta l + Z_0 \cdot \cos \beta l} \cdot Z_0$$

where
- $C_2$: the capacitance of the diode 29,
- $Z_0$: the characteristic impedance of the distributed constant line 24,
- $l$: the length of the line 24, and
- $\beta$: the phase constant of the line 24.

$$= j \frac{-\frac{1}{\omega C_2} \cdot \cos \beta l + Z_0 \sin \beta l}{\frac{1}{\omega C_2} \cdot \sin \beta l + Z_0 \cdot \cos \beta l} \cdot Z_0$$

Putting the term in the brackets by $\mathcal{X}$ $$Z = j\mathcal{X}$$

The impedance $Z_{in}$ of the line as seen from the juncture C is shown by $$Z_{in} = \frac{\frac{j}{j\omega C_1}}{j\mathcal{X} + \frac{1}{j\omega C_1}} = \frac{j\mathcal{X}}{1 - \mathcal{X} \cdot \omega C_1}$$

where $C_1$ represents the capacitance of the diode 28.

Therefore the amplitude characteristic $H(\omega)$ between the input and the output of this circuit is shown by the following equation where R represent the resistance of the PIN diode $$|H(\omega)| = \left|\frac{Z_{in}}{R + Z_{in}}\right| = \left|\frac{1}{1 + R/Z_{in}}\right| = \tag{4}$$

$$\frac{1}{\sqrt{1 + \left[\frac{R(1 - \mathcal{X} \omega C_1)}{\mathcal{X}}\right]^2}} =$$

$$\frac{1}{\sqrt{1 + \left(\frac{R}{Z_0}\right)^2 \cdot \left(\frac{Z_0 \cdot \cos \beta l + \frac{1}{\omega C_2} \cdot \sin \beta l}{Z_0' \cdot \sin \beta l - \frac{1}{\omega C_2} \cdot \cos \beta l} - Z_0 \cdot \omega C_1\right)^2}}$$

The resonance frequency of this circuit, that is the frequency $f_0$ at which the pass loss becomes zero can be obtained by making zero the terms in the brackets of this equation. Thus, $$Z_0 \cdot \cos \beta l + \frac{1}{\omega C_2} \cdot \sin \beta l - Z_0^2 \omega C_1 \cdot \sin \beta l + \tag{5}$$

$$Z_0 \cdot \frac{\omega C_1}{\omega C_2} \cos \beta l = Z_0 \left(1 + \frac{C_1}{C_2}\right) \cos \beta l -$$

$$\left(Z_0^2 \cdot \omega C_1 - \frac{1}{\omega C_2}\right) \sin \beta l = 0$$

Since the variable capacitance diodes 28 and 29 are identical, they are controlled by a control signal applied to the control terminal 26 such that their capacitance ratio $C_1/C_2$ is a constant. Consequently $(1 + C_1/C_2)$ is also constant. In equation (5), by putting $(1 + C_1/C_2) = k$ and $Z_0 k = Z_0'$ we obtain $$Z_0' \cdot \cos \beta l - \left(\omega \cdot \frac{(Z_0')^2 \cdot C_1}{k} - \frac{1}{\omega C_2}\right) \sin \beta l = 0 \tag{6}$$

The center frequency $f_0$ can be obtained by determining the angular frequency $\omega$ from equation (6).

Comparing equation (6) with equation (3)

$$L = \frac{(Z_0')^2}{k} \times C_1$$

and by making constant the characteristic impedance $Z_0$ of the distributed constant line, $Z_0'$ also becomes constant. This means that varying the capacitance of the variable capacitance diode 28 according to this invention is equivalent to the varying of the inductance L of a coil constituting the prior art series resonance circuit. In other words, in the circuit shown in FIG. 1 when the control voltage applied to the control terminal 26 is varied, not only the capacitance component of the impedance of the circuit but also the inductance component is varied. Thus, with the circuit shown in FIG. 1, when the capacitance is varied, the inductance component which constitutes a parallel resonance circuit with the capacitance is also varied simultaneously, so that it is possible to increase the range of variation of the resonance frequency over that of the prior art series resonance circuit. In other words, it is possible to vary the center frequency $f_0$ of the amplitude equalizing characteristic in a broader bandwidth that in the prior art.

Figure 2:
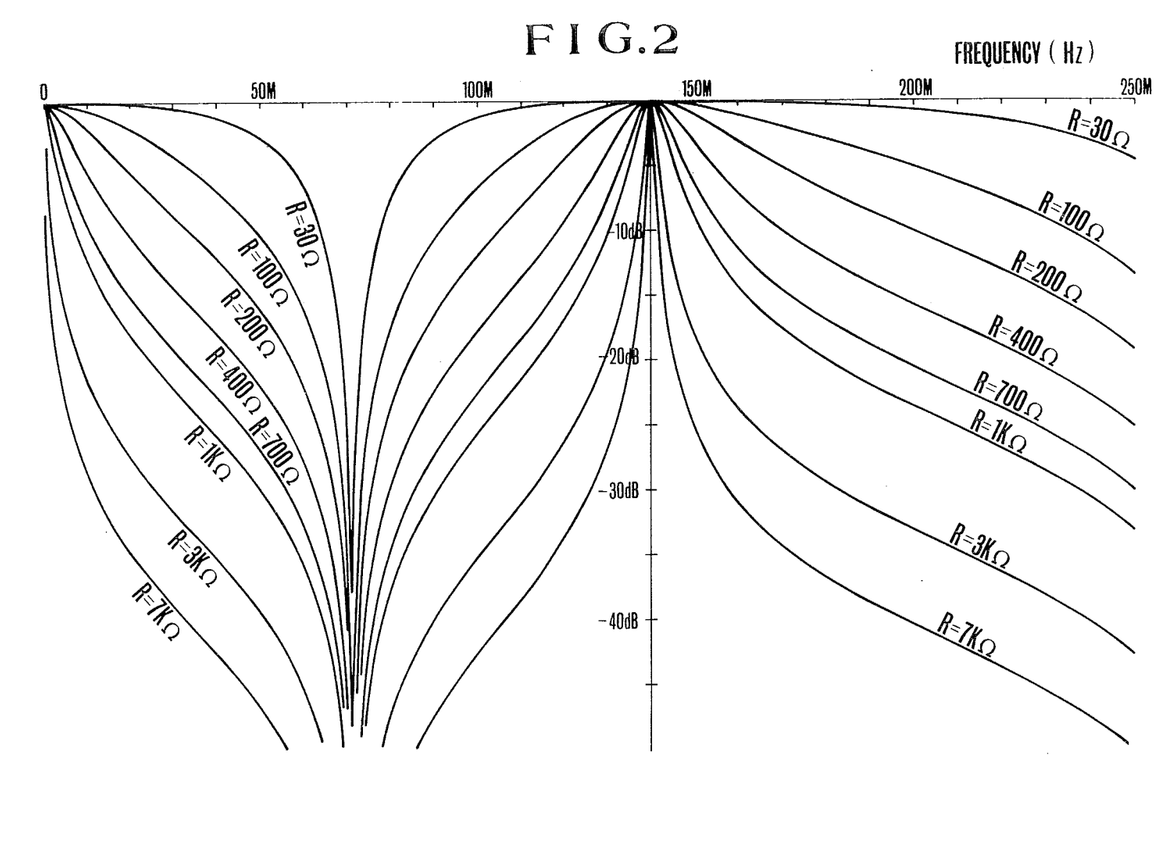
FIG. 2 is a graph showing the frequency-pass loss characteristics obtained by varying the variable resistance device shown in FIG. 1.

FIG. 2 shows the frequency-pass loss characteristics that is the amplitude equalizing characteristics when the control voltage applied across the terminals 20 and 22 is varied to vary the resistance from 30 ohms to 7 Kilo ohms. These characteristics were obtained by selecting the length of the coaxial line to be $l = 0.4$ m, its characteristic impedance $Z_0 = 75$ ohms, the ratio of the capacitances $C_1$ and $C_2$ of the variable capacitance diodes to be 4, and $C_1 = 6$ pF.

From these characteristic curves, it can be noted that as the resistance value increases, the Q of the resonance circuit increases and the amplitude equalizing characteristics become steeper.

Figure 3:
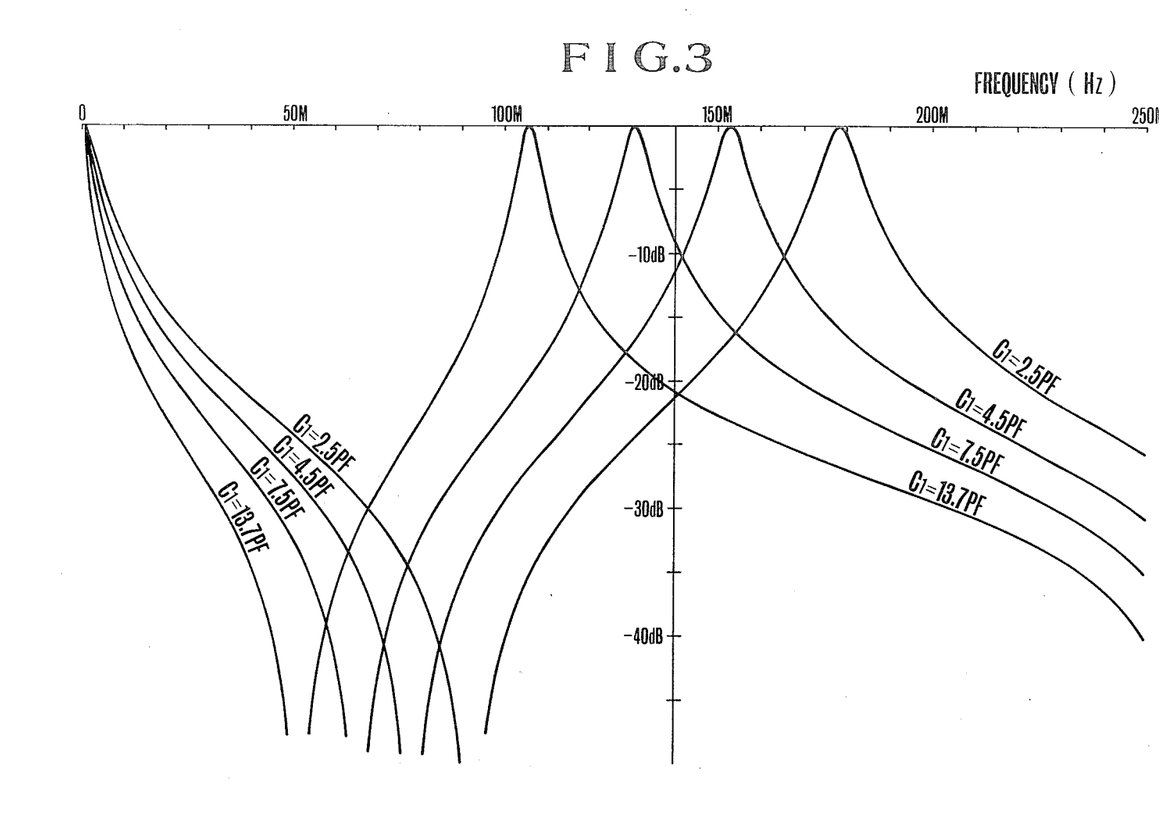
FIG. 3 is a graph showing the frequency-pass loss characteristics obtained by varying the variable capacitance device in FIG. 1.

FIG. 3 shows the frequency-pass loss characteristics when the control voltage applied to the control terminal 26 shown in FIG. 1 is varied to vary the capacitance of the variable capacitance diode 29 from 2.5 pF to 13.7 pF. These curves were obtained with the same parameters as in FIG. 2. At this time, the resistance of the PIN diode 14 was 1 Kilo ohms. These characteristic curves show that the center frequency $f_0$ varies greatly as the capacitance of the variable capacitance diode varies.

Figure 4:
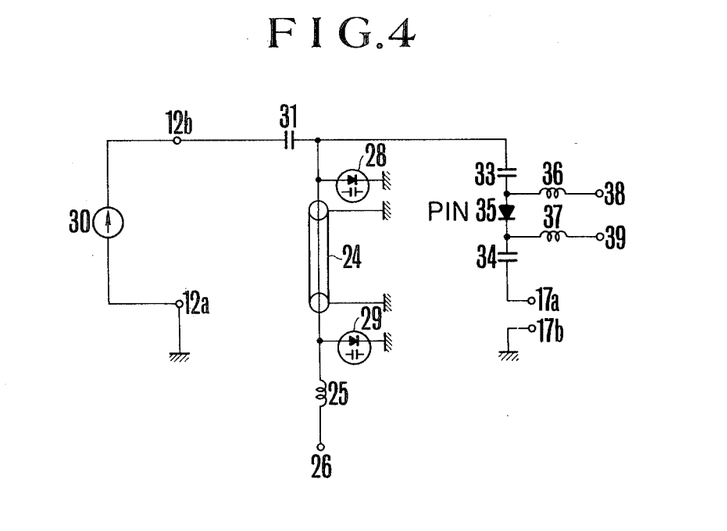
FIG. 4 is a connection diagram showing a modified embodiment of this invention.

FIG. 4 shows a modification of the amplitude equalizing circuit of this invention in which a high output impedance signal source 30 is used as a current source, and a DC blocking capacitor 31 is connected between an input terminal 12b and a distributed constant line 24. A variable resistance device comprising DC signal blocking capacitors 33 and 34, a PIN diode 35, and AC signal blocking choke coils 36 and 37 is connected between the distributed constant line 24 and its output terminal 17a. The PIN diode 35 is supplied with a control voltage through input terminals 38 and 39.

This modification has the same advantages as the embodiment shown in FIG. 1.

Although in the foregoing embodiments, the variable capacitance diodes 28 and 29 had the same rating, if desired, they may have different capacitance or different/control voltage-capacitance variation characteristics.

With the construction as shown in FIGS. 1 and 4, an anti-resonance point occurs at substantially the middle point of the center frequency $f_0$ and the zero frequency (direct current). For this reason, at frequencies near the anti-resonance point the fading amplitude characteristic cannot be contemplated by this invention. More particularly, although it is possible to equalize the amplitude characteristic in a bandwidth of ±15 MHz about the center frequency $f_0$, in a frequency band higher than the difference between the non-resonance frequency and the center frequency $f_0$, it is impossible to equalize the amplitude in a bandwidth of one half thereof.

Figure 5:
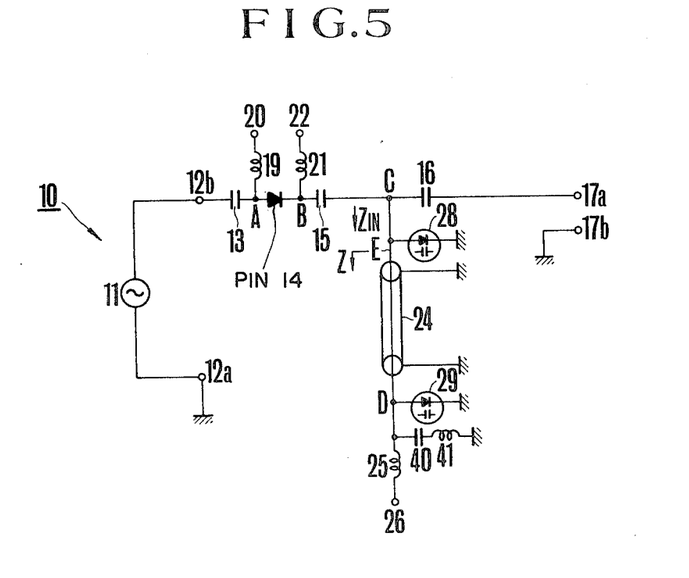
FIG. 5 is a connection diagram showing a still further embodiment of this invention.

FIG. 5 shows a still further modification of the amplitude equalizing circuit 10 of this invention that can solve this problem. The circuit shown in FIG. 5 is different from that shown in FIG. 1 in that serially connected DC blocking capacitor 40 and a coil 41 are connected in parallel with the variable capacitance diode 29. The inductance of coil 41 is selected to be sufficiently larger that the impedance of the associated circuit, that is the impedance of the variable capacitance diode connected in parallel therewith. With this arrangement, at a frequency lower than the center frequency, the impedance of the coil 41 become smaller than the case in which the coil 41 is not used with the result that the insert loss, or the pass loss, between the input and thus output becomes larger, thus eliminating the anti-resonance point. This condition will be described later in detail with reference to FIGS. 6 and 7. As will be become apparent, provision of the coil 41 eliminates the anti-resonance point which may occur at the middle between the center frequency $f_0$ and the zero frequency, without changing the characteristics near the center frequency $f_0$. As a consequence, with the equalizing circuit according to this modification including the coil 41, it is possible to equalize the fading over a wide frequency range about the center frequency $f_0$. In addition as above described it is possible to vary the center frequency $f_0$ over a wide frequency range by varying the capacitance value of the variable capacitance diode.

Let us now describe how to determine the input/output characteristic of the circuit shown in FIG. 5.

The impedance $Z_1$ of $C_2$ and L as seen from point D is expressed by $$Z_1 = \frac{j\omega L \cdot \frac{1}{j\omega C_2}}{j\omega L + \frac{1}{j\omega C_2}} = \frac{j\omega L}{1 - \omega^2 L C_2} = jZ_1'$$

where L represents the inductance of the coil 41

$$Z_1' = \frac{\omega L}{1 - \omega^2 L C_2} = \frac{1}{\frac{1}{\omega L} - \omega C_2}$$

The impedance $Z_2$ of the distributed constant line as seen from point E is expressed by $$Z_2 = \frac{Z_1 \cdot \cos \beta l + jZ_0 \cdot \sin \beta l}{jZ_1 \cdot \sin \beta l + Z_0 \cos \beta l} \cdot Z_0$$

-continued $$\approx j \left[ \frac{Z_1' \cdot \cos \beta l + Z_0 \sin \beta l}{-Z_1' \cdot \sin \beta l + Z_0 \cos \beta l} \cdot Z_0 \right] = jZ_2'$$

where $Z_2' = \frac{Z_1' \cos \beta l + Z_0 \sin \beta l}{-Z_1' \cdot \sin \beta l + Z_0 \cos \beta l} \cdot Z_0$ Furthermore, the impedance $Z_{in}$ of the distributed constant line as seen from point C is shown by $$Z_{in} = \frac{\frac{jZ_2'}{j\omega C_1}}{\frac{1}{j\omega C_1} + jZ_2'} = \frac{jZ_2'}{1 - \omega C_1 Z_2'}$$

Consequently, the input/output characteristic $H(\omega)$ is shown by $$|H(\omega)| = \left| \frac{Z_{in}}{R + Z_{in}} \right| = \left| \frac{1}{1 + R/Z_{in}} \right| = \tag{7}$$

$$\frac{1}{\sqrt{1 + \left[ \frac{R(1 - \omega C_1 Z_2')}{Z_2'} \right]^2}} =$$

$$\frac{1}{\sqrt{1 + \left(\frac{R}{Z_0}\right) \cdot \left(\frac{-Z_1' \cdot \sin \beta l + Z_0 \cos \beta l}{Z_0 \sin \beta l + Z_1' \cos \beta l} - Z_0 \cdot \omega C_1\right)^2}}$$

Thus, the center frequency $f_0$ of this circuit at which the resonance frequency that is the pass loss becomes zero is obtained by making the term in the brackets in the numerator of equation (7) to zero.

Numerator = $-Z_1' \sin \beta l + Z_0 \cos \beta l - Z_0 \omega C_1 \cdot \sin \beta l$
$\phantom{Numerator =} -Z_0 \cdot Z_1' \omega C_1 \cos \beta l$
$\phantom{Numerator} = Z_0 (1 - Z_1' \omega C_1) \cos \beta l -$
$\phantom{Numerator =} (Z_1' + Z_0^2 \omega C_1) \cdot \sin \beta l = 0$ As can be noted from the foregoing analysis, like the embodiments shown in FIGS. 1 and 5, in this modification too, by varying the capacitance of the variable capacitance device, the apparent inductance component is also varied thus broadening the bandwidth than that provided by the prior art circuit utilizing a series resonance circuit.

Figure 6:
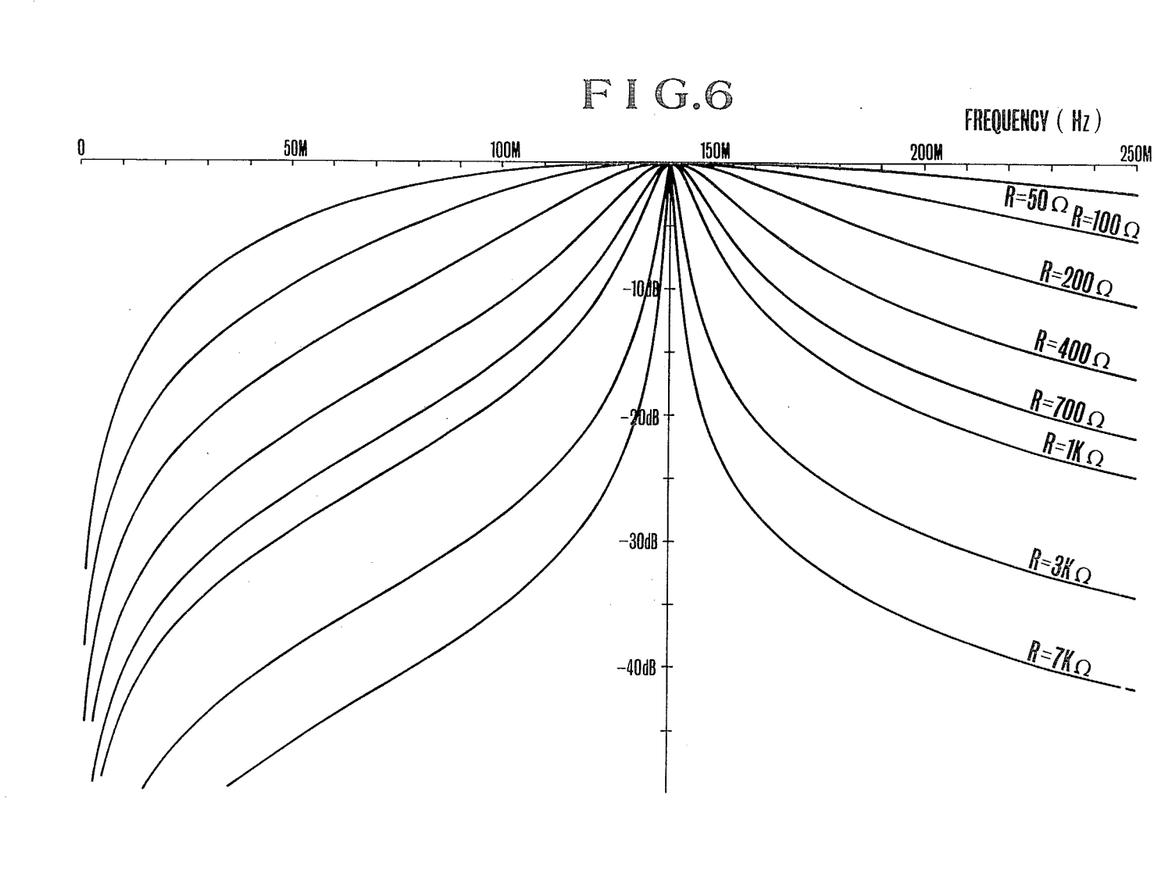
FIG. 6 is a graph showing the frequency-pass loss characteristics obtained by varying the variable resistance device shown in FIG. 5.
Figure 7:
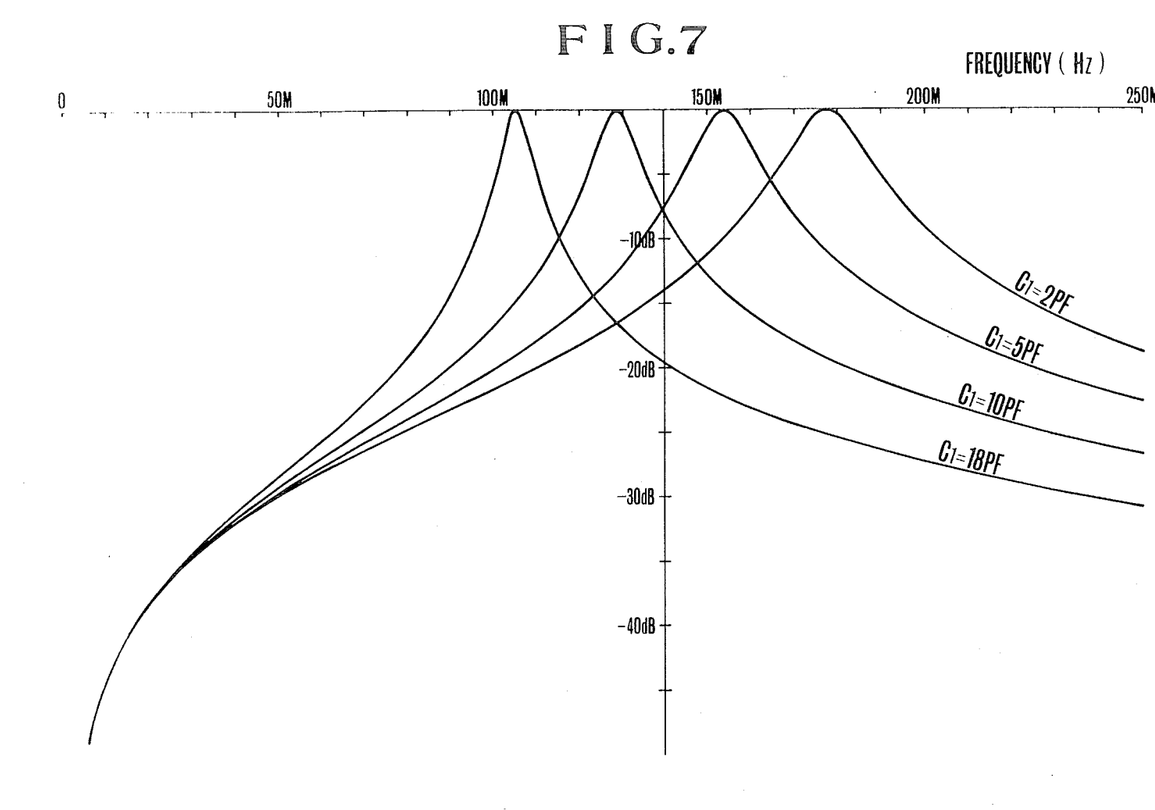
FIG. 7 is a graph showing the frequency-pass loss characteristics obtained by varying the capacitance of the variable capacitance device shown in FIG. 5.

The result of analysis can be proven by the characteristic curves shown in FIGS. 6 and 7. FIG. 6 shows the frequency-pass loss characteristics which are obtained by varying the voltage impressed across the control terminals 20 and 22 shown in FIG. 5 to vary the resistance from 50 ohms to 7 K ohms, these characteristic curves corresponding to those shown in FIG. 2 obtained with the circuit shown in FIG. 1. These curves were obtained with the parameters of the length of the coaxial line l=0.2 m, its characteristic impedance $Z_0 = 75$ ohms, the ratio of the capacitances of the variable capacitance diodes 28 and 29 of 4, $C_1 = 7.4$ pF, and the inductance of coil 41 L=20 nH. From these curves it will be understood that no anti-resonance point appears between the center frequency and the zero frequency even when R is varied largely. Thus, with this circuit, it is possible to broaden the variable bandwidth over the prior art circuit even when a high Q is used.

FIG. 7 is a graph showing the frequency-pass loss characteristics obtained by varying the capacitance of the variable capacitance diode 29 by varying the voltage applied to the control terminal 26 with the circuit shown in FIG. 5. The values of the component elements are the same as those utilized to obtain the characteristics shown in FIG. 6. In this case, the resistance value of the variable resistance device was 1 K ohms. The characteristic curves shown in FIG. 7 show that it is possible to vary the center frequency and hence the bandwidth over a broader range than that provided by the prior art arrangement by varying the value of $C_1$.

Figure 8:
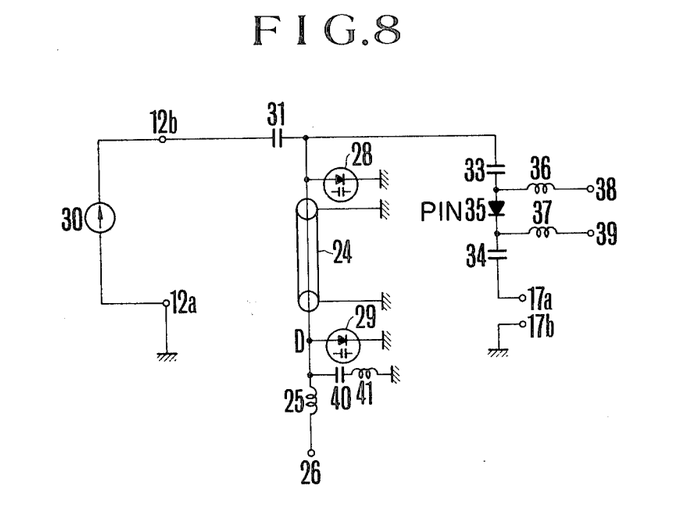
FIG. 8 is a connection diagram showing yet another modification of this invention.

FIG. 8 shows a modification of FIG. 4, which is characterized by connecting a series combination of a DC blocking capacitor 40 and coil 41 in parallel to the variable capacitance diode 29 in the same manner as in FIG. 5. With this modification too, like FIG. 5, it is possible to eliminate anti-resonance point between the center frequency and the zero frequency which is present in the circuit shown in FIG. 4.

It should be understood that the invention is not limited to the specific embodiments described above, and that many changes and modification will be obvious to one skilled in the art. For example, the coil 41 connected in parallel with the variable capacitance diode 29 may be connected in parallel with the other variable capacitance diode or such coils may be connected in parallel with both variable capacitance diodes.

In each embodiment, input and output terminals are shown as pairs, but since one of them is grounded, the grounded terminals may be substituted by a single terminal. Furthermore, any circuit element having distributed constants may be substituted for coaxial line utilized in respective embodiments.

What is claimed is:
1. An amplitude equalizing circuit comprising a variable resistance device having first and second terminals connected between one of a pair of input terminals and one of a pair of output terminals, a common terminal connected to the other ones of said input and output terminal pairs, a distributed constant line connected between said common terminal and one of said first and second terminals of said variable resistance device, a pair of variable capacitance means connected between said common terminal and both ends of said distributed constant line, and means for controlling said variable resistance device and said variable capacitance means for varying the steepness and the center frequency of the amplitude equalizing characteristic of said amplitude equalizing circuit.

2. The amplitude equalizing circuit according to claim 1 wherein said variable capacitance means comprises a variable capacitance diode which varies its capacitance in accordance with a control voltage applied to one terminal thereof.

3. The amplitude equalizing circuit according to claim 1 wherein said variable resistance device comprises a PIN diode which varies its resistance value in accordance with a voltage impressed across the PIN diode.

4. The amplitude equalizing circuit according to claim 1 which further includes a coil connected in parallel with one of said variable capacitance means.

5. The amplitude equalizing circuit according to claim 4 which further comprises a DC blocking capacitor connected in series with said coil.

* * * * *